United States Patent [19]
Dao et al.

[11] 3,711,711
[45] Jan. 16, 1973

[54] SCANNING ELECTRON MICROSCOPE SCANNING SYSTEM

[75] Inventors: James Dao, Alameda; Nelson C. Yew, Los Altos, both of Calif.

[73] Assignee: Etec Corporation, Mountain View, Calif.

[22] Filed: Nov. 9, 1970

[21] Appl. No.: 87,676

[52] U.S. Cl. ........................250/49.5 A, 250/49.5 PE
[51] Int. Cl. ............................................H01j 37/26
[58] Field of Search...250/49.5 PE, 49.5 A, 49.5 AE, 250/49.5 ED

[56] References Cited

UNITED STATES PATENTS

R27,005 2/1969 Wingfield ......................250/49.5 PE
3,341,704 9/1967 Thomas ........................250/49.5 PE

*Primary Examiner*—James W. Lawrence
*Assistant Examiner*—C. E. Church
*Attorney*—Townsend and Townsend

[57] ABSTRACT

A scanning system for scanning electron microscopes in which the electron beams of the electron-optical column and the cathode ray tube are deflected in response to the number of electrons collected, the amplitude of the cathode ray tube beam being maintained constant. This may be accomplished by amplifying and integrating the collected electrons, and appropriately controlling the deflection of the electron beams in response thereto. Accordingly, the scanning system provides synchronous velocity modulation of the electron beams of the cathode ray tube and the electron-optical column.

12 Claims, 1 Drawing Figure

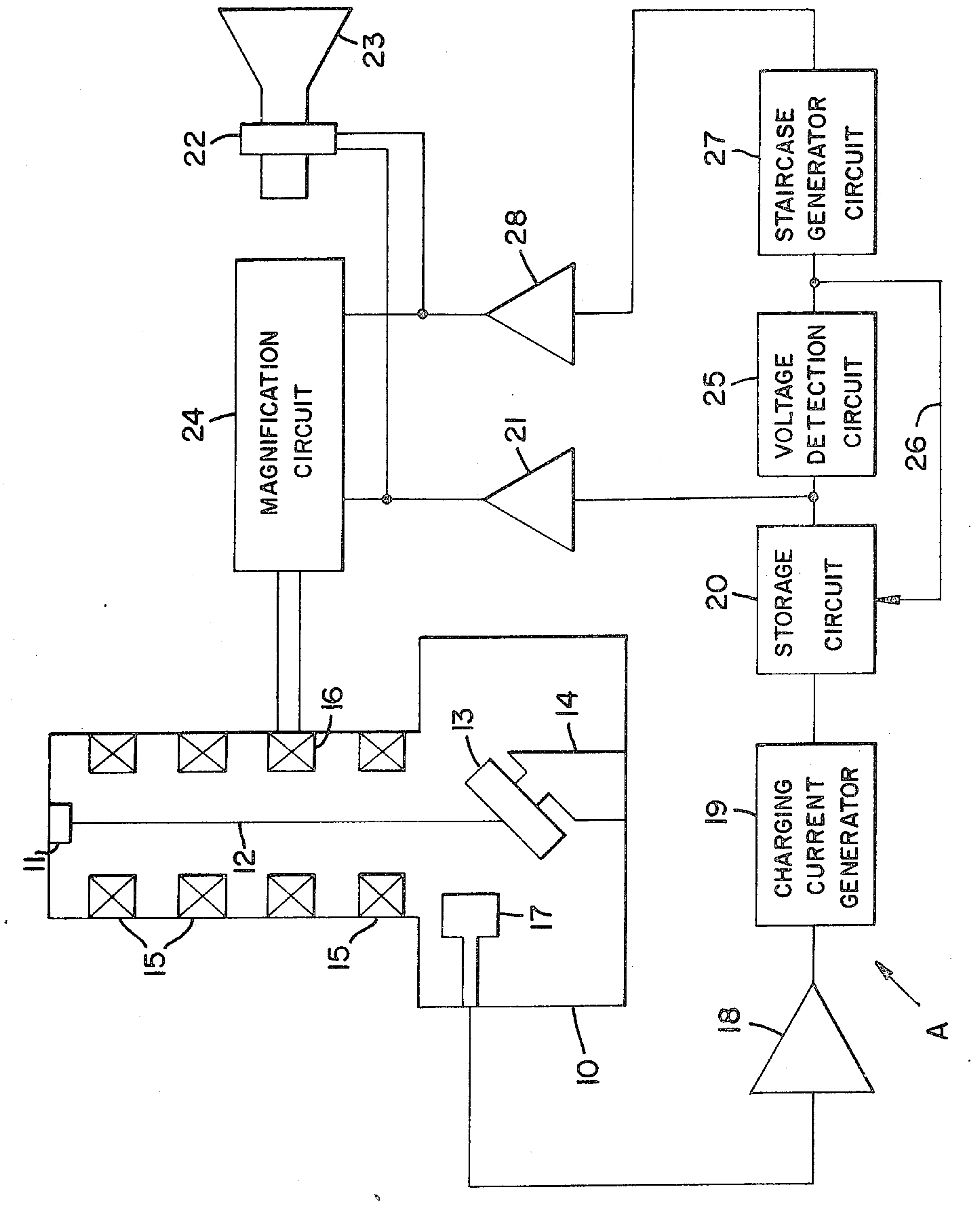
INVENTORS
JAMES DAO
NELSON C. YEW
BY
Townsend and Townsend
ATTORNEYS

SCANNING ELECTRON MICROSCOPE SCANNING SYSTEM

This invention relates to a scanning system for scanning electron microscopes.

In a scanning electron microscope, a beam of electrons emitted from an electron source disposed within an electron-optical column is focused upon, and caused to scan, a specimen. The scanning of the electron beam is typically accomplished by a pair of magnetic deflection coils disposed along the path of the electron beam, the deflection coils being suitably energized to produce a raster-like scanning at substantially constant velocity. Incidence of the electron beam upon the specimen causes the reflection or emission of electrons, which electrons are collected, amplified and employed to modulate the intensity of the beam of a cathode ray tube, the cathode ray tube being scanned in synchronism with the scanning of the electron beam of the electron-optical column. Accordingly, an intensity modulated image of the specimen is produced upon the face of the cathode ray tube.

Such a conventional scanning system suffers from several drawbacks and disadvantages. In particular, since the dark regions of the specimen image result from the collection of a small number of electrons, and since the statistical variation or noise is inversely proportional to the square root of the number of electrons collected, the resultant image possesses a greater noise level in such dark or shadow regions. In accordance with conventional scanning electron microscopy, the scanning rate of the electron beam is reduced in order to improve the noise level in such dark or shadow regions. This solution, however, is undesirable as it results in an increase in the brightness of the light regions of the image, which requires the resetting of the contrast of the cathode ray tube, and can create image washout or other poor picture qualities due to saturation of the cathode ray tube. The reduction of the scanning rate also increases the time required to expose a complete photograph, as the reduced scan-rate is unnecessarily slow for the bright regions and hence is wasteful of valuable machine time.

These drawbacks are overcome in accordance with the present invention by controlling the scanning of the electron beams of the electron-optical column and the cathode ray tube in response to the number of electrons collected, while maintaining the amplitude of the cathode ray tube beam constant. This will result in the scanning of the cathode ray tube with a constant amplitude beam, the velocity of the beam depending upon the number of electrons collected. Thus, the present invention may be regarded as providing synchronous velocity modulation of the beams of the cathode ray tube and the electron-optical column. While the cathode ray tube display thus produced may appear to differ somewhat from a typical raster-type display, a photographic time exposure of the cathode ray tube image produced by the velocity modulation system according to the present invention will be substantially identical to that produced by a raster-type system.

It is thus an object of the present invention to provide a scanning electron microscope in which the beams of the electron-optical column and the cathode ray tube are synchronously scanned in response to the number of electrons collected.

Another object of the present invention is to provide a scanning electron microscope in which the electron beams of the electron-optical column and the cathode ray tube are velocity modulated.

Still another object of the present invention is to provide a scanning electron microscope in which the statistical variation problem or noise is substantially minimized while the picture quality is maximized.

Yet another object of the present invention is to provide a scanning electron microscope in which the dependence of the picture quality upon the contrast setting of the cathode ray tube is substantially eliminated.

The scanning system for the scanning electron microscope according to the present invention is thus advantageous in that the noise level will be substantially uniform over the entire image, thus achieving the highest overall image quality in the minimum amount of time. Furthermore, the dependence of image quality on the settings of the contrast control of the cathode ray tube will be substantially eliminated, thereby further improving image quality.

These and other objects, features and advantages of the present invention will be more readily apparent from the following detailed description of the present invention with reference to the accompanying drawing, wherein:

The drawing is a block diagram of a scanning electron microscope incorporating the scanning system according to the present invention.

Referring now to the drawing, there is shown a scanning electron microscope, indicated generally at A, having an electron-optical column 10. Disposed within electron-optical column 10 is an electron source 11 adapted to emit a beam of electrons 12 directed toward a specimen 13, supported by a stage 14 within the electron-optical column. A plurality of magnetic focusing coils 15, typically numbering three, are successively disposed along the path of electron beam 12. Focusing coils 15 are suitably energized to produce magnetic lens fields which function to focus beam 12 upon specimen 13.

A magnetic deflection coil 16 is also disposed along the path of electron beam 12, magnetic deflection coil 16 typically being disposed between the second and third magnetic lens coils 15. As will be described in greater detail hereinafter, magnetic deflection coil 16 is energized to provide a magnetic field which causes electron beam 12 to be deflected so as to scan specimen 13. The incidence of electron beam 12 upon specimen 13 causes electrons to be reflected from, or emitted by, specimen 13, which electrons are collected by an electron collector 17.

The foregoing scanning electron microscope electron-optical column structure is old in the art and is described herein for illustrative purposes only, it being understood that the scanning electron microscope scanning system according to the present invention may be employed with other electron-optical column structures.

According to the present invention, the output of electron collector 17 is connected to the input of a current amplifier 18, which produces a voltage output signal proportional to the number of electrons collected by electron collector 17. The output of current amplifier 18 is connected to the input of a charging current generator 19. Charging current generator 19 comprises a controlled constant current source responsive to the voltage applied thereto, so that a current proportional to the output voltage of current amplifier 18 will appear at the output of charging current generator 19. Thus, the current at the output of charging current generator 19 will be proportional to the number of electrons collected by electron collector 17.

The output current of charging current generator 19 is applied to the input of a storage circuit 20, which functions to store or integrate the current applied thereto. Thus, at its output, storage circuit 20 produces a voltage representing the integral of the current applied thereto. Preferably, but not necessarily, storage circuit 20 may comprise a capacitor and a high input impedence amplifier, the capacitor being connected to the input of the amplifier. The capacitor functions to charge in accordance with the charging current applied thereto, while the amplifier functions to read the voltage across the capacitor without discharging same.

The output of storage circuit 20 is connected to the input of a current amplifier 21, which, in turn, is connected to the horizontal portion of a deflection coil 22 disposed around the neck of a cathode ray tube 23. Accordingly, the beam of cathode ray tube 23 will be horizontally deflected in response to the output voltage of storage circuit 20, and thus in accordance with the number of electrons collected by electron collector 17. Thus, as electrons are collected by electron collector 17, the beam of cathode ray tube 23 will be horizontally deflected in accordance with the number of electrons collected.

The output of amplifier 21 is also applied, via a magnification circuit 24, to the horizontal portion of deflection coil 16. Magnification circuit 24 typically comprises an attenuator, either active or passive, which functions to apply an attenuated version of the output signal of amplifier 21 to the horizontal portion of deflection coil 16. Accordingly, electron beam 12 of electron-optical column 10 will be deflected in accordance with the output of amplifier 21. Thus electron beam 12 will be deflected in synchronism with the beam of cathode ray tube 23, the excursions of the respective beams being similar, but of unequal magnitude, electron beam 12 being deflected to a lesser extent due to the attenuating action of magnification circuit 24, in order to achieve magnification in a manner conventionally employed in scanning electron microscopy.

The output of storage circuit 20 is also connected to the input of a voltage detection circuit 25. Voltage detection circuit 25 functions to detect the presence of a particular voltage input and produce an output signal in response thereto, the voltage input signal level corresponding to the desired maximum horizontal deflection of the respective beams of the electron-optical column 10 and cathode ray tube 23.

Thus, at the end of each horizontal scan, an output signal will appear at the output of voltage detection circuit 25. The output of voltage detection circuit 25 is applied, via a lead 26, to storage circuit 20 in such a manner that storage circuit 20 will be reset when an output signal appears at voltage detection circuit 25. In particular, if storage circuit 20 comprises a capacitor as described hereinbefore, suitable circuitry may be provided to discharge the capacitor upon receipt of a signal on lead 26. This, in turn, would cause the respective beams of electron-optical column 10 and cathode ray tube 23 to be simultaneously horizontally deflected to their initial horizontal positions.

In order to accomplish the vertical deflection of the beams of electron-optical column 10 and cathode ray tube 23, there is provided a staircase generator circuit 27 connected to the output of voltage detection circuit 25. Staircase generator circuit 27 functions to produce an output voltage which increases in discreet increments upon receipt of a signal from voltage detection circuit 25. Staircase generator circuit 27 may either comprise analog or digital circuitry for accomplishing this function. In particular, if analog circuitry is to be employed, staircase generator circuit 27 may comprise a stepping circuit adapted to incrementally charge a capacitor upon receipt of a signal from voltage detector circuit 25. A high input impedence amplifier may be connected to the capacitor to read the voltage stored therein, thus producing the output signal referred to hereinbefore. If, however, digital circuitry is to be employed, staircase generator circuit 27 may comprise a stepping circuit driving a memory element, which, in turn, energizes a ladder network to produce the staircase output signal referred to hereinbefore.

The output signal of staircase generator circuit 27 is applied to a current amplifier 28, the output of which is connected to the vertical portion of deflection coils 22. Thus, the beam of cathode ray tube 23 will be vertically deflected in response to the output voltage of staircase generator 27. Similarly, the output of current amplifier 28 is applied, via magnification circuit 24, to the vertical portion of deflection coil 16, so that electron beam 12 of electron-optical column 10 will be vertically deflected in a similar manner. Since voltage detection circuit 25 produces an output signal at the completion of a horizontal scan, it is apparent that the completion of a horizontal scan will be accompanied by an incremental vertical deflection of the respective beams of electron-optical column 10 and electron cathode ray tube 23. Thus, it is apparent that the scanning system according to the present invention will produce a raster-like scanning pattern, the velocity of the beams being dependent upon the number of electrons collected.

In operation, a specimen 13 is suitably mounted to stage 14, and the interior of electron-optical column 10 is substantially evacuated. Appropriate voltages are applied to electron source 11 and focusing coils 15, so as to cause a beam of electrons 12 to be emitted from electron source 11, and focused upon specimen 13. Similarly, appropriate operating voltages are applied to cathode ray tube 23 so as to cause a beam of electrons to be focused upon the face of cathode ray tube 23.

Incidence of electron beam 12 upon specimen 13 results in the emission or reflection of electrons, which electrons are collected by electron collector 17. The thus collected electrons are amplified by current amplifier 18, and cause a charging current to be produced by charging current generator 19. The charging current produced by charging current generator 19 is integrated by storage circuit 20, the output of which is amplified by current amplifier 21 and applied to deflection coil 22, so as to cause the electron beam of cathode ray tube 23 to be horizontally deflected in accordance therewith. Similarly, the attenuated version of the output of current amplifier 21 applied by magnification circuit 24 to deflection coil 16 causes electron beam 12 to be horizontally deflected in a similar manner.

Accordingly, the deflection velocities of electron beams will be controlled by the number of electrons collected by electron collector 17. Since the beam of cathode ray tube 23 is maintained at a constant intensity, and the number of electrons collected is employed to control the amount of time that the beam of cathode ray tube 23 remains at a particular location, a velocity modulated image of specimen 13 will be produced on the face of cathode ray tube 23.

At the end of a horizontal line, or, more particularly, when the voltage storage circuit 20 reaches the predetermined level corresponding thereto, voltage detection circuit 25 will produce an output signal. The signal thus produced causes staircase generator circuit 27 to increase its output, causing the beam of cathode ray tube 23 to be vertically deflected to a subsequent scan line position. Similarly, electron beam 12 is vertically deflected by the attenuated version of staircase signal produced by magnification circuit 24. Simultaneously, the output of voltage detection circuit 25 causes storage circuit 20 to be reset, which, in turn, causes the electron beams to be horizontally deflected to their initial horizontal positions, in a manner similar to that described hereinbefore. Thus, the electron beams have been translated to the start of a subsequent scan line, and the operation described hereinbefore is similarly repeated until a suitable number of horizontal scan lines have been scanned so as to produce a velocity modulated image of specimen 13 on the face of cathode ray tube 23.

As is conventional in scanning electron microscopy, a camera may be disposed in front of cathode ray tube 23, and a suitable time exposure may be taken so as to produce a photograph of the velocity modulated image produced on the face of cathode ray tube 23. Although the image produced by the scanning system according to the present invention is velocity modulated, as opposed to intensity modulated images employed in the prior art, the resulting photograph will be substantially identical to that produced according to prior art systems.

The scanning system according to the present invention is advantageous, however, in that the noise level will be substantially uniform over the entire image. Furthermore, the dependence of image quality on the settings of the contrast control of the cathode ray tube will be substantially eliminated, thereby further improving image quality. Moreover, it is apparent that the scanning system according to the present invention will produce the best overall image quality available in the particular exposure time employed.

While a particular embodiment of the present invention has been described in detail, it is apparent that adaptations and modifications may be made without departing from the true spirit and scope of the invention, as set forth in the claims.

What is claimed is:

1. A scanning electron microscope comprising: electron source means for emitting an electron beam, focusing means for focusing said electron beam upon a specimen, an electron collector disposed adjacent said specimen, a cathode ray tube having an electron beam internal thereto, and scanning means for deflecting said electron beams in response to the number of electrons collected by said electron collector, the intensity of the electron beam of said cathode ray tube being substantially constant.

2. Apparatus according to claim 1 wherein said scanning means comprises storage means for integrating the output of said electron collector, and deflection means for deflecting said electron beams in a first direction in response to the output of said storage means.

3. Apparatus according to claim 2 wherein said scanning means further comprises voltage detection means for producing a signal when the output of said storage means reaches a predetermined level and means for incrementally deflecting said electron beams in a second direction in response to the signal produced by said voltage detection means.

4. Apparatus according to claim 3 wherein said second direction is perpendicular to said first direction.

5. Apparatus according to claim 3 further comprising means for discharging said storage means in response to the signal produced by said voltage detection means.

6. Apparatus according to claim 5 wherein said storage means comprises a capacitor and a controlled current source responsive to the output of said electron collector, said capacitor being connected to the output of said control current source.

7. In a scanning electron microscope having electron source means for emitting an electron beam, focusing means for focusing said electron beam upon a specimen, an electron collector disposed adjacent said specimen and a cathode ray tube having an electron beam internal thereto, the improvement comprising: scanning means for deflecting said electron beams in response to the number of electrons collected by said electron collector, the intensity of the electron beam of said cathode ray tube being substantially constant.

8. Apparatus according to claim 7 wherein said scanning means comprises storage means for integrating the output of said electron collector, and deflection means for deflecting said electron beams in a first direction in response to the output of said storage means.

9. Apparatus according to claim 8 wherein said scanning means further comprises voltage detection means for producing a signal when the output of said storage means reaches a predetermined level and means for incrementally deflecting said electron beams in a second direction in response to the signal produced by said voltage detection means.

10. Apparatus according to claim 9 wherein said second direction is perpendicular to said first direction.

11. Apparatus according to claim 9 further comprising means for discharging said storage means in response to the signal produced by said voltage detection means.

12. Apparatus according to claim 11 wherein said storage means comprises a capacitor and a controlled current source in response to the output of said electron collector, said capacitor being connected to the output of said control current source.

* * * * *